US010145462B2

(12) United States Patent
Slayter et al.

(10) Patent No.: US 10,145,462 B2
(45) Date of Patent: Dec. 4, 2018

(54) SHAFT INTERNAL LUBRICATION WITH RIFLING GROOVES

(71) Applicant: Hamilton Sundstrand Corporation, Charlotte, NC (US)

(72) Inventors: Matthew Allen Slayter, Rockford, IL (US); Richard A. Himmelmann, Beloit, WI (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 161 days.

(21) Appl. No.: 15/246,683

(22) Filed: Aug. 25, 2016

(65) Prior Publication Data

US 2018/0058569 A1 Mar. 1, 2018

(51) Int. Cl.
*F16H 57/04* (2010.01)
*F02C 7/275* (2006.01)
*F16N 7/36* (2006.01)

(52) U.S. Cl.
CPC ........... *F16H 57/043* (2013.01); *F02C 7/275* (2013.01); *F16H 57/0426* (2013.01); *F16H 57/0434* (2013.01); *F16N 7/363* (2013.01); *F05D 2220/32* (2013.01); *F05D 2260/98* (2013.01)

(58) Field of Classification Search
CPC ............... F16H 57/0428; F16H 57/043; F16H 57/0471; F04B 39/0253; F04B 39/0246
USPC ........................................................ 184/6.12
See application file for complete search history.

(56) References Cited

U.S. PATENT DOCUMENTS

| 1,689,319 A * | 10/1928 | Bonner ..................... F01L 7/04 123/196 V |
| 1,741,900 A * | 12/1929 | Alden ....................... F42B 5/02 102/430 |
| 1,910,902 A * | 5/1933 | McKone ................. F01M 1/06 123/41.38 |
| 1,930,520 A * | 10/1933 | Kaufman ................. F01M 1/06 184/13.1 |
| 2,085,814 A * | 7/1937 | Matthews ............. F16H 57/043 184/6.12 |
| 3,106,138 A * | 10/1963 | Thoma .................. F01B 3/0085 184/18 |
| 3,276,677 A * | 10/1966 | Trask ................... F04B 39/0246 184/18 |

(Continued)

FOREIGN PATENT DOCUMENTS

| DE | 102009019401 | 11/2010 |
| DE | 102014111461 | 2/2016 |

OTHER PUBLICATIONS

EP Application No. 17183944.2 Extended European Search Report dated Jan. 19, 2018, 8 pages.

*Primary Examiner* — Henry Y Liu
(74) *Attorney, Agent, or Firm* — Cantor Colburn LLP

(57) ABSTRACT

According to an aspect, a shaft internal lubrication system includes a shaft body having an outer wall and a central bore defining an inner wall. The shaft internal lubrication system also includes a plurality of lubrication holes axially distributed along the central bore and fluidically connecting the inner wall and the outer wall. At least one rifling groove on the inner wall forms a lubrication flow path to two or more of the lubrication holes. The shaft internal lubrication system further includes a feed tube within the central bore operable to drip feed a lubricant to the inner wall.

13 Claims, 3 Drawing Sheets

(56) References Cited

U.S. PATENT DOCUMENTS

| | | | | |
|---|---|---|---|---|
| 3,581,728 A * | 6/1971 | Abraham | F01L 3/08 | 123/188.9 |
| 4,614,123 A * | 9/1986 | Tompkins | B06B 1/16 | 184/6.18 |
| 5,168,767 A * | 12/1992 | Morita | F16H 25/2204 | 184/99 |
| 5,181,834 A * | 1/1993 | Ikeda | F04B 27/12 | 184/6.17 |
| 5,795,140 A * | 8/1998 | Jin | F04B 39/0253 | 184/6.18 |
| 6,247,556 B1 * | 6/2001 | Chen | F16H 25/2204 | 184/102 |
| 6,398,687 B2 * | 6/2002 | Iwata | F16H 57/0457 | 475/160 |
| 6,450,073 B1 * | 9/2002 | Boyer | B23Q 1/40 | 82/129 |
| 6,484,846 B1 * | 11/2002 | Parker | F04B 39/0253 | 184/6.16 |
| 6,666,581 B1 * | 12/2003 | Boyer | B23Q 1/40 | 184/6.14 |
| 6,871,627 B2 * | 3/2005 | Fujikubo | F01M 11/02 | 123/196 R |
| 7,100,743 B2 * | 9/2006 | Park | F04B 39/0246 | 184/6.16 |
| 7,144,229 B2 * | 12/2006 | Ishida | F04B 39/0246 | 417/415 |
| 7,832,994 B2 * | 11/2010 | Akashi | F04B 39/0253 | 184/6.6 |
| 8,435,016 B2 * | 5/2013 | Telakowski | F04C 18/0215 | 184/6.16 |
| 8,840,510 B2 * | 9/2014 | Nomura | F16H 1/32 | 184/6.12 |
| 9,238,503 B2 * | 1/2016 | Kubo | B63H 20/002 | |
| 2003/0141149 A1 * | 7/2003 | Shintoku | F04B 27/109 | 184/6.18 |
| 2006/0054405 A1 * | 3/2006 | Custer | F01L 1/181 | 184/6 |
| 2015/0080134 A1 * | 3/2015 | Tage | F16H 57/0426 | 464/7 |
| 2015/0233464 A1 * | 8/2015 | Wiens | F16C 33/6666 | 184/6.12 |

\* cited by examiner

SHAFT INTERNAL LUBRICATION WITH RIFLING GROOVES

BACKGROUND

The subject matter disclosed herein generally relates to lubrication systems, and more specifically to shaft internal lubrication using rifling grooves in a splash lubrication environment.

Rotating shafts often have a need to be lubricated with the intent of feeding lubrication to attached components. When there are very small shaft diameters and a low lubrication feed pressure, it can be challenging to provide lubrication from inside a shaft to the attached components.

SUMMARY

According to one embodiment, a shaft internal lubrication system includes a shaft body having an outer wall and a central bore defining an inner wall. The shaft internal lubrication system also includes a plurality of lubrication holes axially distributed along the central bore and fluidically connecting the inner wall and the outer wall. At least one rifling groove on the inner wall forms a lubrication flow path to two or more of the lubrication holes. The shaft internal lubrication system further includes a feed tube within the central bore operable to drip feed a lubricant to the inner wall.

In addition to one or more of the features described above, or as an alternative to any of the foregoing embodiments, further embodiments may include where the at least one rifling groove includes two or more riffling grooves, and each of the two or more riffling grooves contacts a different subset of the lubrication holes.

In addition to one or more of the features described above, or as an alternative to any of the foregoing embodiments, further embodiments may include where the lubrication holes provide splash lubrication to a plurality of components coupled to the shaft body.

In addition to one or more of the features described above, or as an alternative to any of the foregoing embodiments, further embodiments may include where the lubrication holes provide splash lubrication to a plurality of components proximate to the shaft body.

In addition to one or more of the features described above, or as an alternative to any of the foregoing embodiments, further embodiments may include where the feed tube is configured to receive the lubricant from an excess lubricant supply collected in a passage formed substantially perpendicular to an axis of rotation of the shaft body.

In addition to one or more of the features described above, or as an alternative to any of the foregoing embodiments, further embodiments may include a scupper configured to collect the lubricant splashed upon exiting the shaft body, where the scupper is in fluid communication with the passage to provide the lubricant collected.

In addition to one or more of the features described above, or as an alternative to any of the foregoing embodiments, further embodiments may include where the passage is a vertical column in a gearbox housing, and the lubrication flow path within the central bore is a substantially horizontally oriented spiral configured to urge the lubricant toward a driven end of the shaft body.

In addition to one or more of the features described above, or as an alternative to any of the foregoing embodiments, further embodiments may include where the at least one rifling groove is configured to urge the lubricant longitudinally through the central bore due to centrifugal forces.

According to another embodiment, a reduction gearbox of a core-turning system for a gas turbine engine is provided. The reduction gearbox includes a reduction gear train operable to drive rotation of a starter gear train of the gas turbine engine. The reduction gear train includes a plurality of gear systems driven by a shaft having a shaft internal lubrication system. The shaft internal lubrication system includes a shaft body having an outer wall and a central bore defining an inner wall. The shaft internal lubrication system also includes a plurality of lubrication holes axially distributed along the central bore and fluidically connecting the inner wall and the outer wall. The at least one rifling groove forms a lubrication flow path to two or more of the lubrication holes. The reduction gearbox also includes a mounting pad with an interface to couple a core-turning motor to the reduction gear train.

In addition to one or more of the features described above, or as an alternative to any of the foregoing embodiments, further embodiments may include where the lubrication holes provide splash lubrication to the gear systems driven by the shaft.

In addition to one or more of the features described above, or as an alternative to any of the foregoing embodiments, further embodiments may include a feed tube within the central bore operable to drip feed a lubricant to the at least one rifling groove, where the feed tube is configured to receive the lubricant from an excess lubricant supply collected in a passage of a housing of the reduction gearbox.

According to a further embodiment, a method of providing internal shaft lubrication includes drip feeding a lubricant to a feed tube within a central bore of a shaft body. The lubricant is urged along a lubrication flow path including at least one rifling groove on an inner wall of the shaft body formed by the central bore and a plurality of lubrication holes axially distributed along the shaft body that fluidically connects the inner wall with an outer wall of the shaft body. The lubricant is sprayed out of the lubrication holes responsive to rotation of the shaft body.

In addition to one or more of the features described above, or as an alternative to any of the foregoing embodiments, further embodiments may include collecting the lubricant splashed upon exiting the shaft body by a scupper, where the scupper is in fluid communication with the passage to provide the lubricant collected.

In addition to one or more of the features described above, or as an alternative to any of the foregoing embodiments, further embodiments may include where the lubricant is urged along the lubrication flow path via centrifugal forces acting on the lubricant due to rotation of the shaft body.

Technical effects of embodiments of the present disclosure include using rifling grooves within a rotatable shaft to provide lubrication to components attached to the shaft.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Embodiments provide a lubrication flow path through a rotating shaft using rifling grooves. Lubricant can be collected in a reservoir and drip fed into a central bore of the shaft. Rifling grooves in the central bore of the shaft provide axial flow within the shaft, where radial holes in the shaft release the lubricant to components coupled to or proximate to the shaft. An example of a system in which shaft internal lubrication can be implemented is further described in reference to FIGS. 1-4.

Figure 1:
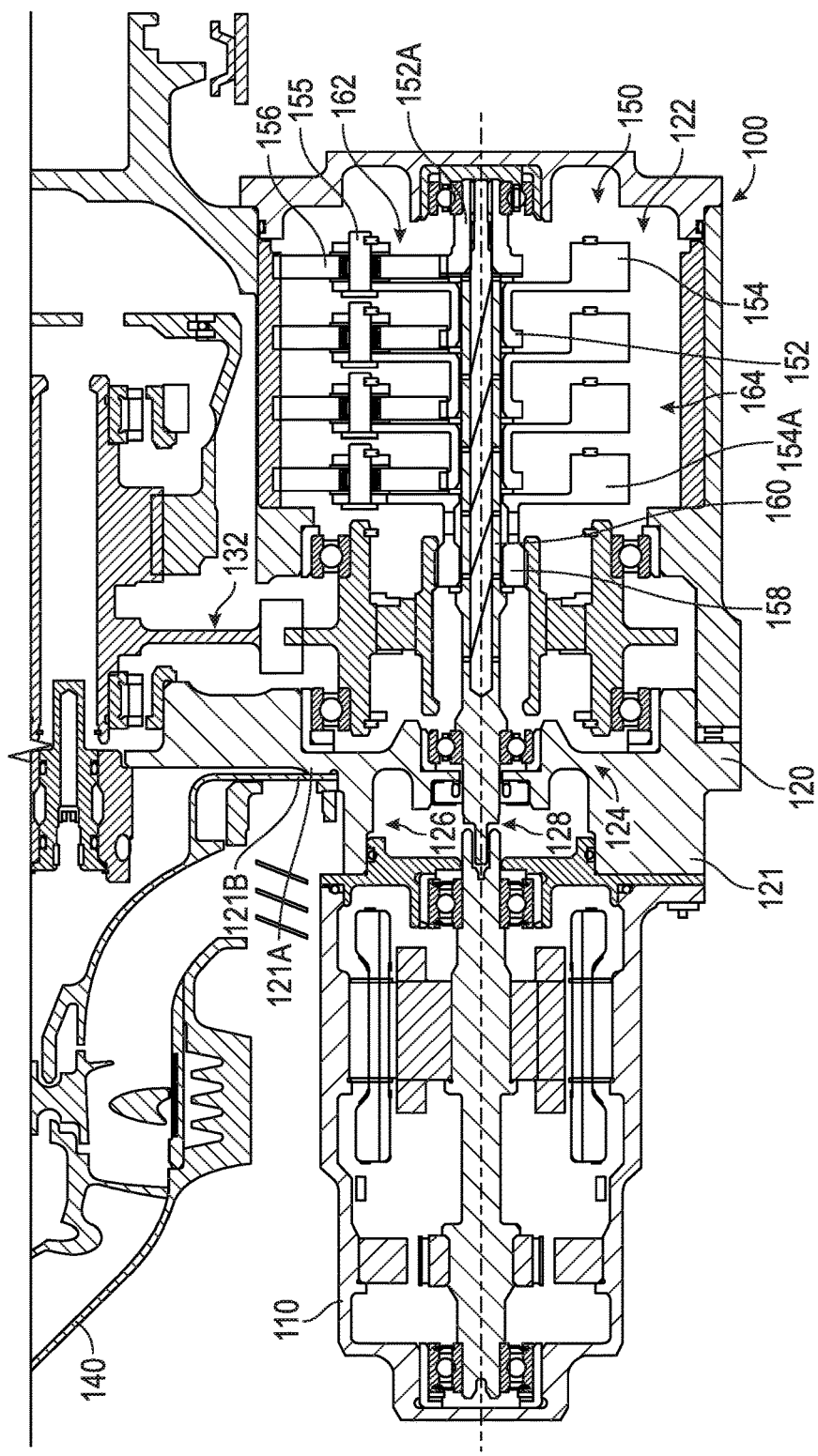
FIG. 1 is a sectional view of a core-turning system for a gas turbine engine, according to an embodiment of the present disclosure.

As depicted in FIG. 1, a core-turning system 100 can include a reduction gearbox 120 and a starter 140 that may be integrally formed within an outer housing 121. The core-turning system 100 can be operably connected to a gas turbine engine through one or more other components (not depicted), such as an accessory gear box and a tower shaft. Operable connections can include gear mesh connections that in some instances can be selectively engaged or disengaged, for instance, through one or more clutches. The reduction gearbox 120 includes a reduction gear train 122 within the outer housing 121. A core-turning motor 110 can be operably connected to the reduction gear train 122 at a mounting pad 126 that interfaces to a core-turning input 128 of the reduction gear train 122. The core-turning motor 110 may be an electric motor. A core-turning clutch 124 interfaces the reduction gear train 122 to a starter gear train 132 of the starter 140. In operation, the core-turning clutch 124 may engage and disengage the reduction gear train 122 with the starter gear train 132.

The starter 140 is operable to start a gas turbine engine and may drive engine rotation at a lower speed for a longer duration than typically used for engine starting in a motoring mode of operation (also referred to as dry motoring) to prevent/reduce a bowed rotor condition. A bowed rotor condition refers to a condition that can occur after engine shutdown where heat from the engine core rises to the top of the engine case, resulting in the engine rotor axis bending or "bowing" due to uneven heat distribution. The core-turning motor 110 is operable to perform slow engine rotation at a much slower speed than is typically used for motoring or engine starting, for instance, less than 10 revolutions per minute as compared to greater than 1000 revolutions per minute. The core-turning motor 110 can be used to prevent or slowly reduce a bowed rotor condition. If a bowed rotor condition has developed, for instance, due to a hot engine shutdown and without taking further immediate action, motoring may be performed by the starter 140 to more rapidly reduce a bowed rotor condition but may reduce service life of some starter system components. If a bowed rotor condition has not yet developed, the core-turning motor 110 can perform slow engine rotation while allowing time for substantially even engine cooling.

The reduction gear train 122 of the reduction gearbox 120 enables a higher angular velocity output of the core-turning motor 110 to result in lower angular velocity engine rotation using gear systems 150. In the example of FIG. 1, the gear systems 150 can be arranged as stacked planetary gear systems including a stacked series of coaxially aligned sun gears 152 that each drives a plurality of planet gears 156. A distal sun gear 152A is operably connected by a shaft 160 to a core-turning input 128. The distal sun gear 152A is operably connected to a first set 162 of the planet gears 156 of the gear systems 150. The first set 162 of planet gears 156 is operably coupled by pins 155 to a carrier 154 including one of the coaxially aligned sun gears 152 that in turn drives one or more subsequent sets 164 of the planet gears 156 and the coaxially aligned sun gears 152. In an embodiment, the gear systems 150 include four planetary gear systems coaxially positioned about the shaft 160. An end carrier 154A of the gear systems 150 can include shaft 158 that interfaces with the core-turning clutch 124. The core-turning clutch 124 can be coaxially positioned about the shaft 160 between the gear systems 150 and the core-turning motor 110. The starter 140 and the reduction gearbox 120 can be integrally formed within outer housing 121, for instance, where a first housing portion 121A of the reduction gearbox 120 is coupled with a second housing portion 121B of the starter 140.

Figure 2:
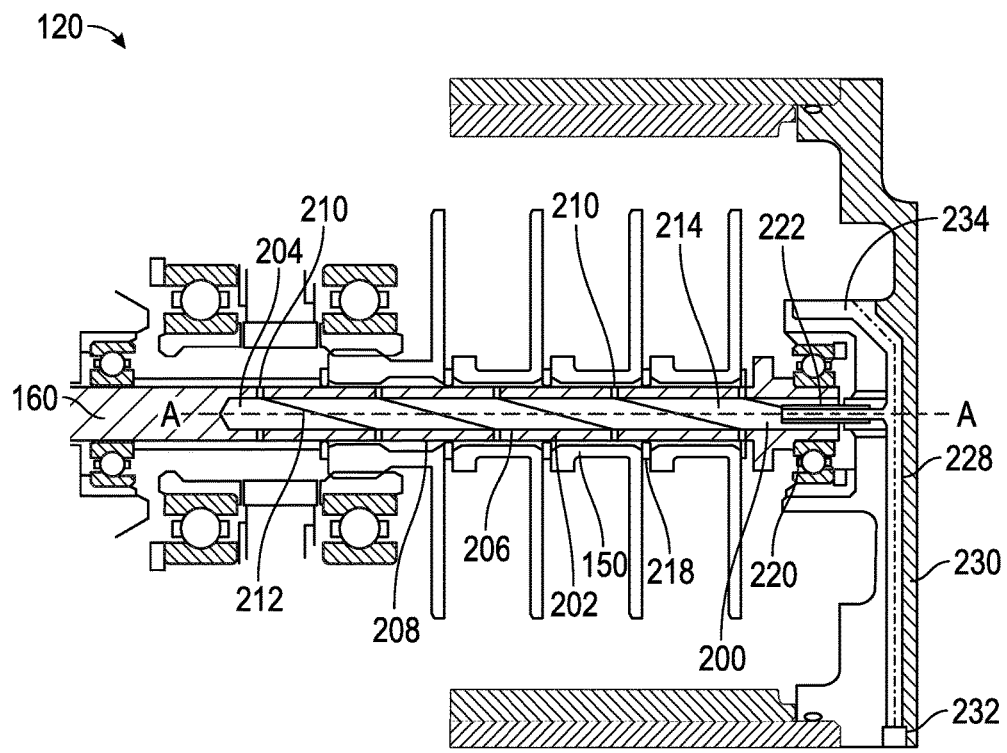
FIG. 2 is a partial sectional view of a shaft internal lubrication system of the core-turning system of FIG. 1, according to an embodiment of the present disclosure.
Figure 3:
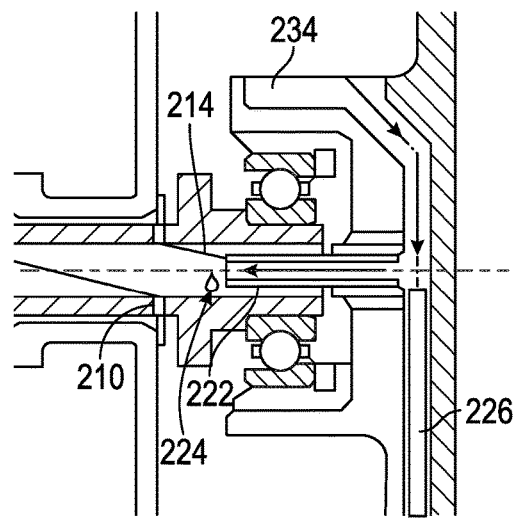
FIG. 3 depicts a lubrication flow path of the shaft internal lubrication system of FIG. 2, according to an embodiment of the present disclosure.
Figure 4:
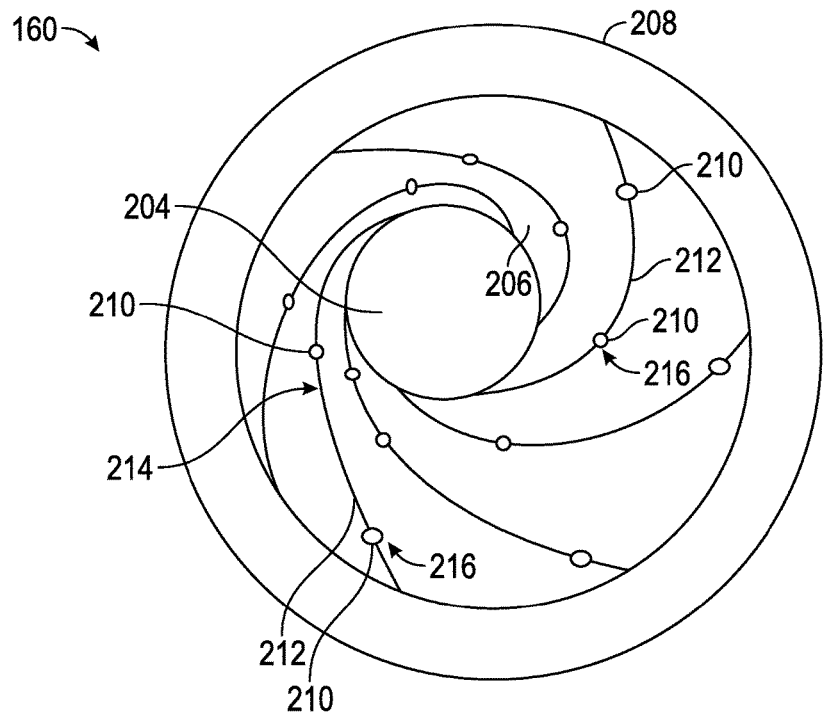
FIG. 4 depicts lubrication flow paths of at least one rifling groove and lubrication holes, according to an embodiment of the present disclosure.

A shaft internal lubrication system 200 of the reduction gearbox 120 of the core-turning system 100 of FIG. 1 for a gas turbine engine is depicted in greater detail in FIG. 2. The shaft internal lubrication system 200 for the shaft 160 can include a shaft body 202 having an outer wall 208 and a central bore 204 defining an inner wall 206. The shaft internal lubrication system 200 also include a plurality of lubrication holes 210 axially distributed along the central bore 204 and fluidically connecting the the inner wall 206 and the outer wall 208. The shaft internal lubrication system 200 further includes at least one rifling groove 212 on the inner wall 206, where the at least one rifling groove 212 forms a lubrication flow path 214 to two or more of the lubrication holes 210. The at least one rifling groove 212 can include two or more riffling grooves 212 (as best seen in FIG. 4) and each of the two or more riffling grooves 212 contacts a different subset 216 (FIG. 4) of the lubrication holes 210. The lubrication holes 210 can provide splash lubrication to the gear systems 150 driven by the shaft 160. For instance, the lubrication holes 210 can provide splash lubrication to a plurality of components coupled to or proximate to the shaft body 202, such as thrust washers 218, bearings 220, and the like. In some embodiments, the shaft internal lubrication system 200 can lubricate a plurality of components of FIG. 1, such as sun gears 152, carriers 154, pins 155, planet gears 156, and the like.

A feed tube 222 within the central bore 204 is operable to drip feed a lubricant 224 to the at least one rifling groove 212, where the feed tube 222 is configured to receive the lubricant 224 from an excess lubricant supply 226 collected in a passage 228 of a housing 230 (e.g., outer housing 121 of FIG. 1) of the reduction gearbox 120 as depicted in FIGS.

2 and 3. The passage 228 may be formed by cross drilling the housing 230 and sealed with a plug 232. The passage 228 may be formed substantially perpendicular to an axis of rotation A of the shaft body 202. The passage 228 can be a vertical column, and the lubrication flow path 214 within the central bore 204 can be a substantially horizontally oriented spiral configured to urge the lubricant 224 toward a driven end of the shaft body 202, e.g., urged toward the core-turning input 128 of FIG. 1. The lubricant 224 can be urged along the lubrication flow path 214 via centrifugal forces acting on the lubricant 224 due to rotation of the shaft body 202. A scupper 234 can be configured to collect the lubricant 224 splashed upon exiting the shaft body 202, where the scupper 234 is in fluid communication with the passage 228 to provide the lubricant 224 collected.

Figure 5:
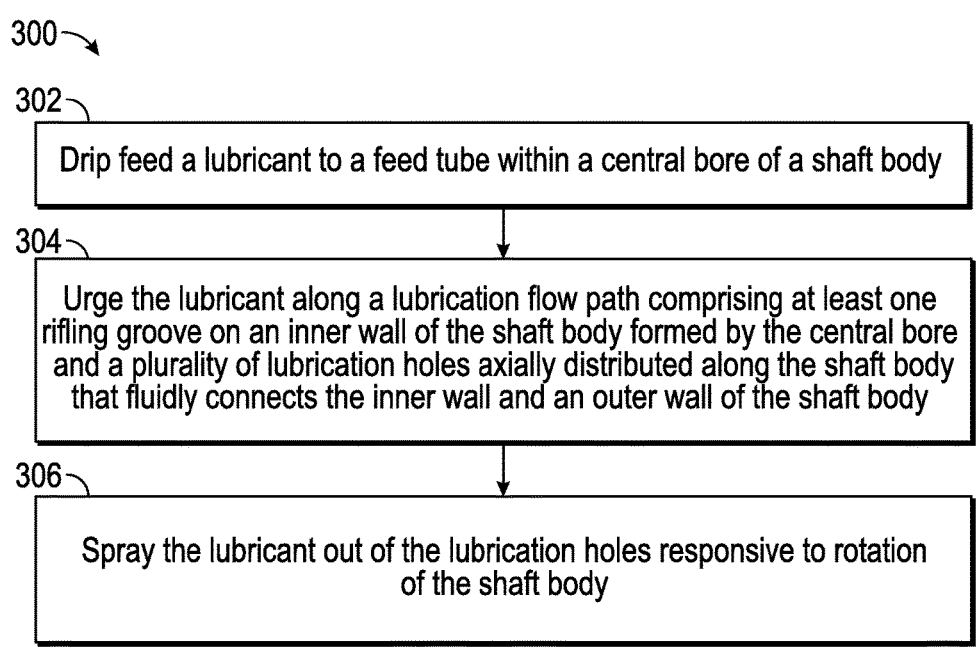
FIG. 5 is a flow process illustrating a method of shaft internal lubrication according to an embodiment of the present disclosure.

Referring now to FIG. 5 while referencing components of the core-turning system 100 of FIGS. 1-4, a flow process illustrating a method 300 of providing internal shaft lubrication in the core-turning system 100 of FIGS. 1-4 is depicted, according to an embodiment of the present disclosure. At block 302, lubricant 224 is drip fed from excess lubricant supply 226 to feed tube 222 within the central bore 204 of shaft body 202. At block 304, the lubricant 224 is urged along a lubrication flow path 214 including at least one rifling groove 212 on an inner wall 206 of the shaft body 202 formed by the central bore 204 and a plurality of lubrication holes 210 axially distributed along the shaft body 202 that fluidically connects the inner wall 206 and the outer wall 208. The lubricant can be urged along the lubrication flow path 214 via centrifugal forces acting on the lubricant 224 due to rotation of the shaft body 202. The centrifugal forces urge the lubricant 224 radially outwardly, and since the at least one rifling groove 212 is at a larger radial dimension than the rest of the central bore 204, this can cause the lubricant 224 to fill the at least one rifling groove 212. The lubricant 224 exiting the at least one rifling groove 212 through the lubrication holes 210 causes the depth of lubricant 224 within the at least one rifling groove 212 to decrease, thereby resulting in an axial direction of flow as new lubricant 224 flows into the emptying rifling groove 212. At block 306, the lubricant 224 sprays out of the lubrication holes 210 responsive to rotation of the shaft body 202. The lubricant 224 splashed upon exiting the shaft body 202 can be collected by the scupper 234.

While the above description has described the flow process of FIG. 5 in a particular order, it should be appreciated that unless otherwise specifically required in the attached claims that the ordering of the steps may be varied.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A shaft internal lubrication system comprising:
   a shaft body having an outer wall and a central bore defining an inner wall;
   a plurality of lubrication holes axially distributed along the central bore and fluidically connecting the inner wall and the outer wall;
   at least one rifling groove on the inner wall, the at least one rifling groove forming a lubrication flow path to two or more of the lubrication holes; and
   a feed tube within the central bore operable to drip feed a lubricant to the inner wall.

2. The system of claim 1, wherein the at least one rifling groove comprises two or more riffling grooves, and each of the two or more riffling grooves contacts a different subset of the lubrication holes.

3. The system of claim 1, wherein the lubrication holes provide splash lubrication to a plurality of components coupled or proximate to the shaft body.

4. The system of claim 1, wherein the feed tube is configured to receive the lubricant from an excess lubricant supply collected in a passage formed substantially perpendicular to an axis of rotation of the shaft body.

5. The system of claim 4, further comprising a scupper configured to collect the lubricant splashed upon exiting the shaft body, wherein the scupper is in fluid communication with the passage to provide the lubricant collected.

6. The system of claim 4, wherein the passage is a vertical column in a gearbox housing, and the lubrication flow path within the central bore is a substantially horizontally oriented spiral configured to urge the lubricant toward a driven end of the shaft body.

7. The system of claim 1, wherein the at least one rifling groove is configured to urge the lubricant longitudinally through the central bore due to centrifugal forces.

8. A reduction gearbox of a core-turning system for a gas turbine engine, the reduction gearbox comprising:
   a reduction gear train operable to drive rotation of a starter gear train of the gas turbine engine, the reduction gear train comprising a plurality of gear systems driven by a shaft having a shaft internal lubrication system comprising:
   a shaft body having an outer wall and a central bore defining an inner wall;
   a plurality of lubrication holes axially distributed along the central bore and fluidically connecting the inner wall and the outer wall; and
   at least one rifling groove on the inner wall, the at least one rifling groove forming a lubrication flow path to two or more of the lubrication holes; and
   a mounting pad comprising an interface to couple a core-turning motor to the reduction gear train.

9. The reduction gearbox of claim 8, wherein the at least one rifling groove comprises two or more riffling grooves, and each of the two or more riffling grooves contacts a different subset of the lubrication holes.

10. The reduction gearbox of claim 8, wherein the lubrication holes provide splash lubrication to the gear systems driven by the shaft.

11. The reduction gearbox of claim 8, further comprising a feed tube within the central bore operable to drip feed a lubricant to the at least one rifling groove, wherein the feed tube is configured to receive the lubricant from an excess lubricant supply collected in a passage of a housing of the reduction gearbox.

12. The reduction gearbox of claim 11, further comprising a scupper configured to collect the lubricant splashed upon exiting the shaft body, wherein the scupper is in fluid communication with the passage to provide the lubricant collected.

13. The reduction gearbox of claim 11, wherein the passage is a vertical column, and the lubrication flow path within the central bore is a substantially horizontally oriented spiral configured to urge the lubricant toward a driven end of the shaft body.

\* \* \* \* \*